United States Patent
Johnston et al.

(10) Patent No.: US 8,924,391 B2
(45) Date of Patent: Dec. 30, 2014

(54) TEXT CLASSIFICATION USING CONCEPT KERNEL

(75) Inventors: Carolyn P. Johnston, Redmond, WA (US); Bernard L. Johnston, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 12/892,899

(22) Filed: Sep. 28, 2010

(65) Prior Publication Data

US 2012/0078911 A1  Mar. 29, 2012

(51) Int. Cl.
*G06F 17/30* (2006.01)

(52) U.S. Cl.
CPC .............................. *G06F 17/30707* (2013.01)
USPC ............ 707/738; 707/748; 707/763; 707/769

(58) Field of Classification Search
USPC ................................... 707/738, 748, 763, 769
See application file for complete search history.

(56) References Cited

U.S. PATENT DOCUMENTS

| | | | |
|---|---|---|---|
| 6,192,360 B1 | 2/2001 | Dumais et al. | |
| 6,990,496 B1 | 1/2006 | McGee, III et al. | |
| 7,024,400 B2 | 4/2006 | Tokuda et al. | |
| 7,130,837 B2* | 10/2006 | Tsochantaridis et al. | 706/55 |
| 7,444,356 B2 | 10/2008 | Calistri-Yeh et al. | |
| 7,707,129 B2 | 4/2010 | Zhuang et al. | |
| 7,734,623 B2 | 6/2010 | Witbrock et al. | |
| 7,912,864 B2* | 3/2011 | Rejndrup | 707/793 |
| 8,041,733 B2* | 10/2011 | Rouhani-Kalleh | 707/771 |
| 8,122,031 B1* | 2/2012 | Mauro et al. | 707/748 |
| 2001/0042087 A1* | 11/2001 | Kephart et al. | 707/530 |
| 2005/0021357 A1* | 1/2005 | Schuetze et al. | 705/1 |
| 2005/0060643 A1 | 3/2005 | Glass et al. | |
| 2006/0112040 A1 | 5/2006 | Oda | |
| 2007/0294199 A1 | 12/2007 | Nelken et al. | |
| 2009/0157611 A1 | 6/2009 | Kipersztok | |
| 2010/0161605 A1* | 6/2010 | Gabrilovich et al. | 707/736 |
| 2010/0169243 A1* | 7/2010 | Su et al. | 706/12 |
| 2011/0071817 A1* | 3/2011 | Siivola | 704/8 |
| 2011/0202527 A1* | 8/2011 | McCloskey et al. | 707/728 |
| 2012/0197825 A1* | 8/2012 | Medlock et al. | 706/11 |

OTHER PUBLICATIONS

Moschitti, Alessandro, "Kernel Methods, Syntax and Semantics for Relational Text Categorization", Retrieved at <<http://www.ist-luna.eu/pdf/CIKM704-moschitti.pdf >>, Proceeding of the 17th ACM Conference on Information and Knowledge Management, Oct. 26-30, 2008, 10 pages.

(Continued)

*Primary Examiner* — Pierre Vital
*Assistant Examiner* — Andalib Lodhi
(74) *Attorney, Agent, or Firm* — Steven Spellman; Jim Ross; Micky Minhas (57) ABSTRACT

Texts may be classified by mapping the texts to concept space, and by dividing the concept space based on substantive classes. A concept space containing a diverse set of concepts is defined. One example of a concept space is the set of on-line encyclopedia articles, each of which is an example of a concept. A text is scored for relevance against each concept, and a vector is created containing each of the scores. The vector represents the text's position in concept space. For any given substantive class of texts, the concept space may be divided into regions containing texts that are members/non-members of the class. The dividing boundary may be determined by training a classifier on a set of labeled examples of texts that fall inside and outside the class.

20 Claims, 5 Drawing Sheets

(56) References Cited

OTHER PUBLICATIONS

Wang, et al., "Building Semantic Kernels for Text Classification using Wikipedia", Retrieved at << http://cs.gmu.edu/~carlotta/publications/kdd277-domeniconi.pdf. >>, Proceeding of the 14th ACM SIGKDD International Conference on Knowledge Discovery and Data Mining, Aug. 24-27, 2008, 9 pages.

Zhang, et al., "Text classification based on multi-word with support vector machine", Retrieved at << http://meta-synthesis.iss.ac.cn/xjtang/paper/knosys2008_zhangwen.pdf >>, Knowledge-Based Systems, Apr. 2008, pp. 879-886, vol. 21.

* cited by examiner

TEXT CLASSIFICATION USING CONCEPT KERNEL

BACKGROUND

Comparing two texts to determine whether they have words in common is a relatively simple problem using today's technology. A harder problem is comparing two texts to determine whether they have similar meanings. Two texts can be compared to determine whether they contain common words simply by extracting the words (or word stems) in each text and finding the intersection of the two sets. In theory, one could determine how similar, in substance, two texts are by extracting the meaning from each text and comparing the meanings. However, it is difficult to extract the meaning from a text algorithmically.

Because it is hard to extract the meaning from a text, many applications that compare texts use word comparison as a proxy for meaning comparison. A search engine is the canonical example of a text comparison application: a search engine compares one text (the query) with another text (each document in a corpus of indexed documents). Documents that contain the query words appear in the search results. However, the words alone might not indicate what the searcher is looking for, since the same words can refer to several different concepts. For example, the word "lima" refers to a vegetable, and also to the capital city of Peru (although the vegetable is actually named after the city). Thus, a query such as "cooking lima" might refer to recipes for lima beans or cooking classes in Peru. If one enters this query into a search engine, the search engine is likely to return results that contain a high percentage of the terms "cooking" and "lima", but the search engine may not be able to differentiate between the sites that are about bean recipes and those that are about Peruvian culinary schools. It is noted that a search engine is the canonical text-comparison problem, although the same issues arise in other text-comparison applications—e.g., finding articles that are similar to each other, comparing students' term papers to see which ones are similar enough to suggest plagiarism, etc.

Real-world search engines employ some form of relevance ranking. Thus, among those documents that contain the query terms, documents may be given higher or lower scores based on the number of inbound links, the percentage of the document that is devoted to the query terms, the provenance of the document, etc. However, these types of relevance rankings generally try to place documents from well-regarded sources near the top of the results, without regard to the underlying meaning of the text. There are some circumstances in which a mere comparison of words does not produce the results that are sought.

SUMMARY

Texts can be mapped to a linear concept space, thereby allowing the texts to be compared for semantic similarity. Once the texts have been mapped into a concept space, a classifier can be trained to assess whether a text is positive or negative for a particular meaning. Such a classifier can be used for text searching, or various other text-comparison applications.

In order to map texts into concept space, one may start with a large set of concepts—e.g., the set of all Wikipedia articles, where each Wikipedia article represents one concept, and thus one dimension of the space. Each text to be mapped to the concept space is compared to each of the Wikipedia articles using a similarity measure. In other words, each text is given a score (e.g., on a scale of 0.0 to 1.0) against each of the Wikipedia articles, so that each score represents how relevant the text is to each of the articles. If there are n Wikipedia articles, then each text receives n scores. The vector that contains all n scores represents the text's point in an n-dimensional concept space. When two texts have similar meanings, they are likely to receive similar scores against a large number of the articles, and thus are likely to have similar vectors (i.e., similar points in concept space). Conversely, texts that have very different meanings from each other are likely to generate very different scores for a large number of the articles, and thus are likely to be assigned very different points in concept space.

For a given meaning, it is possible to bifurcate the concept space into two regions, one of which is positive for the meaning, the other of which is negative for the meaning. E.g., the concept space can be bifurcated such that the meaning "lima bean recipes" can be ascribed (with some level of certainty) to documents in one region, but not in the other region. The boundary that bifurcates the n-dimensional space can be thought of as an (n−1)-dimensional hyperplane in the n-dimensional space. (The fact that such a hyperplane can be intelligibly defined is a consequence of the linearity of the space; a discussion of this point is deferred to the Detailed Description section.) The boundaries can be used to make decisions in various types of text-comparison problems. For example, a search engine can use such boundaries to decide whether a given document does, or does not, contain the meaning that is sought by a query.

The boundaries between different regions of the concept space can be determined in any appropriate manner. One example way to determine the boundaries is to use machine learning techniques on a set of training data. Given some class of texts (e.g., all texts that have meaning X), a set of positive and negative examples for class membership can be created. That is, one set of texts can be identified that are labeled as being members of the class, and another set of texts can be created that are labeled as being non-members of the class. Machine-learning techniques can use the set of labeled examples to identify the boundary, in concept space, between membership and non-membership in the class. However, machine learning is merely one way to create the boundaries; in another example, the boundaries could be determined by direct human effort.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The act of comparing two texts occurs in many text-processing applications. Text search is one example of such an application. In a text search, a query is compared with each document in an indexed corpus of documents to determine which of the documents responds to the query. In this example, the query is one "text", and each indexed document is another "text." Thus, one phase of the process performed by a search engine typically involves pairwise comparison of the query text with each of the indexed documents to determine which of the documents contain the query text. In addition to search, there are other applications that involve comparing texts. For example, a user might be reading an article on a web site, and the site might want to find similar articles to suggest.

There are text-comparison applications whose actual goal is to find specific words that occur in a text. For example, if one wants to find historical documents that mention President Franklin Roosevelt, one would search on the terms "Franklin" and "Roosevelt." Since the searcher wants to find documents in which Franklin Roosevelt is mentioned, finding documents that contain these two words is actually the end-goal of the search.

However, in many cases, the searcher is not really concerned with the presence of specific terms, per se, but rather with finding documents that relate to a particular topic. A searcher might be interested not so much in documents that mention Franklin Roosevelt, but rather in documents that are truly about Franklin Roosevelt. There are probably numerous documents that mention Franklin Roosevelt in passing, but that are not really about the president. A document that is actually about the president's wife, Eleanor Roosevelt, would almost certainly contain mention of the president's name. A popular children's television show has a character named "Roosevelt Franklin" (who attends an eponymous elementary school), but the name is simply a wordplay intended to appeal to adults watching the show and has nothing to do with the president. A term search on "Franklin" and "Roosevelt" would likely return documents relating to Eleanor Roosevelt or a transcript of the above-mentioned television show. These documents are not likely to be what the searcher is looking for.

There are ways to process a search more accurately than what is described above. For example, documents about Eleanor Roosevelt are likely to contain the terms "Franklin" and "Roosevelt". However, if the document is not really about the president, then the term "Franklin" is likely to appear at relatively low frequency, so such a document would likely be ranked low in the search results. A document about the fictional Roosevelt Franklin is likely to contain the terms "Franklin" and "Roosevelt" as often (or more so) than documents about the president. But if one takes word order into account, then it is relatively easy to distinguish documents about the president from documents about the fictional character.

However, there are some situations where these types of simple rules do not work. Consider the earlier-mentioned example of the "cooking lima" query, which could refer either to recipes for lima beans or cooking classes in Lima, Peru. In the abbreviated syntax that people tend to use on the web, it may be very difficult even to figure out which meaning this query has. The person who enters such a query might be using "lima" as a synonym for "lima beans", in which case the query is probably about lima bean recipes. On the other hand, the person might have meant to say "cooking in lima", but omitted the preposition and the capitalization of the city (as people tend to do when writing web queries), in which case the query is probably about cooking classes in Peru. However, suppose that a search engine has some method of determining which meaning to ascribe to the query—e.g., the search engine operator might have determined that sixty percent of people who enter this term are referring to lima bean recipes, and not cooking classes in Peru, so they probabilistically interpret the query as referring to recipes. Even if the search engine can disambiguate the query in this way, it is not clear what documents the search engine would include in the results. Documents about either topic are likely to contain the terms "cooking" and "lima" at a relatively high frequency. By merely examining the occurrence and frequency of these two terms, it might not even be clear whether two given documents are about the same topic as each other (regardless of whether one can discern what that topic is).

For popular subjects, a search engine might maintain a subject matter index, in which certain documents are identified as relating to a particular topic. For example, since both cooking and travel are popular topics, the search engine algorithm might understand that documents that contain words like "tablespoon", "stir", and "braised" are associated with recipes, and documents that contain phrases like "open to the public", "map", and "hours" are associated with tourist attractions. Thus, assuming that the search engine can determine whether the "cooking lima" query is about a person looking for lima bean recipes or a tourist looking for a cooking class on his upcoming vacation to Peru, it can use this type of subject matter information to determine which documents are responsive to the query.

However, the search engine's ability to understand which documents relate to a particular topic is generally based on the popularity of the topic—i.e., the search engine operator may have determined that searches about recipes and travel destinations occur frequently enough that it is worth it to invest resources in understanding the characteristics of these two types of documents. If the topics are not particularly popular, then it is unlikely that a search engine (or any other text-comparison application) would have a way of understanding the distinction between documents relating to these topics. For example, a document that contains a high frequency of the word "crest" might refer to toothpaste or heraldry. Or a document that contains a high frequency of the word "slug" might be about mollusks or Imperial weights and measures. In theory, the documents themselves contain enough information to distinguish them from each other by topic.

For example, a document that contains high frequencies of the words "slug" and "slime" is likely to refer to one topic (mollusks), while a document that contains high frequencies of the words "slug" and "fathom" is likely to refer to another topic (Imperial units of measure). If one looks only at the fact that these two documents contain different sets of high-frequency words (i.e., "slug" and "slime" in one document, "slug" and "fathom" in the other), it might seem clear that these documents refer to different topics. However, if one document contains "slug" and "slime", and another document contains "slug" and "mucus", then this word-based analysis breaks down: a pure term-based analysis concludes that these two documents are different because they use different words, even though a deeper semantic analysis would show that the slug/slime combination and the slug/mucus combination both suggest these documents are about the same concepts: mollusks. In theory, one could invest in determining what types of words or other patterns are associated with slug-the-mollusk versus slug-the-unit-of-measure. However, for a topic that lacks popularity, a search engine (or other application provider) is unlikely to invest in this type of case-by-case analysis. What is missing is an algorithmic technique for determining which texts have similar meanings, which texts have different meanings, and how to use this information to identify texts that are about a particular topic.

The subject matter herein provides such a technique. In order to assess whether texts have similar or dissimilar meanings, texts are mapped to points in a linear concept space. For any given class of texts (e.g., texts about recipes, texts about travel, texts about mollusks), a classifier can be trained to bifurcate the concept space into two regions: one containing texts that are members of the class, the other containing texts that are non-members of the class. These regions can be used to answer questions, such as "find texts about slug-the-mollusk" by looking for texts that contain the word slug and that are also in the mollusk region of concept space. Or, if the "cooking lima" query is determined to be about lima bean recipes instead of cooking classes in Peru, then the query can be answered meaningfully by looking for texts that contain the terms "cooking" and "lima" and that are also in the "recipe" region of concept space.

Figure 1:
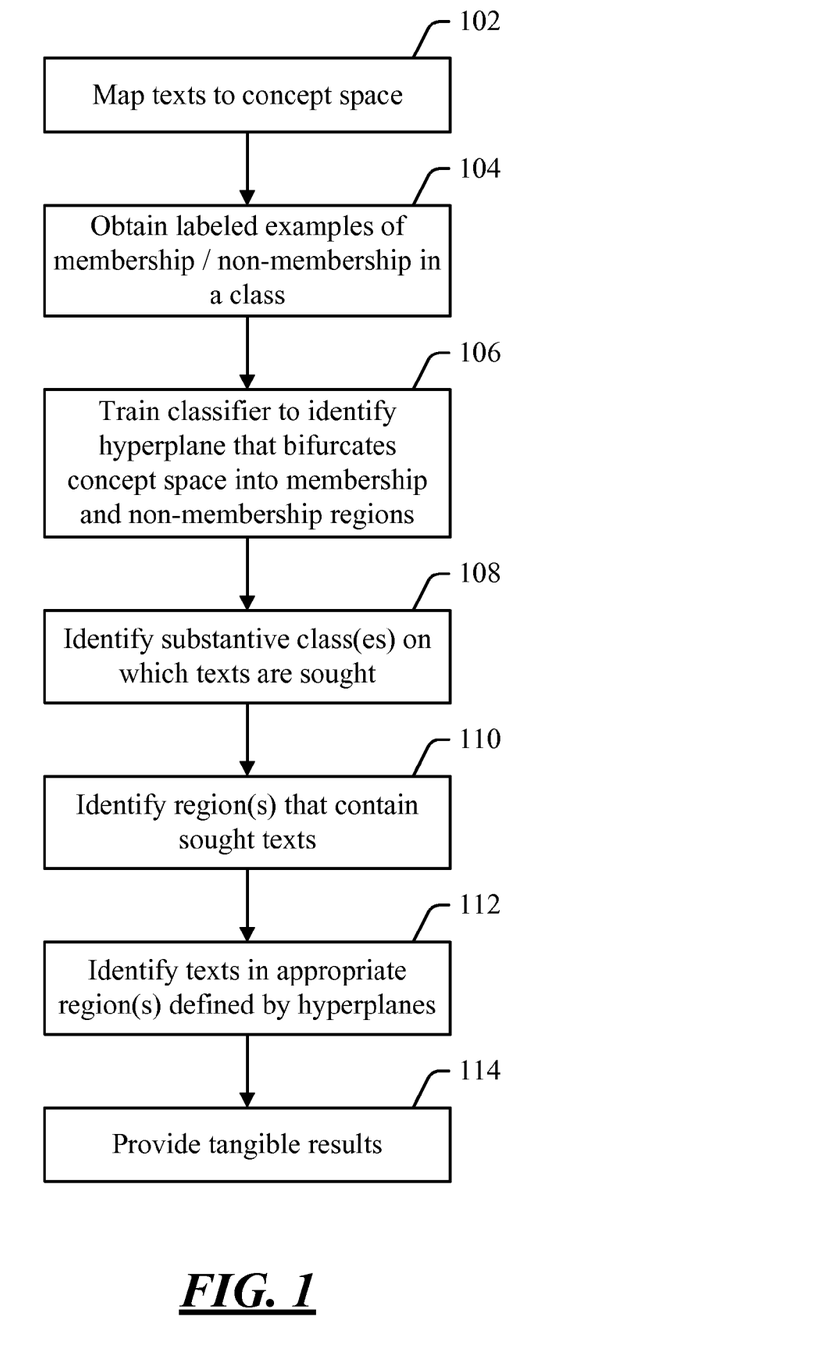
FIG. 1 is a flow diagram of an example process in which texts may be mapped to concept space, and in which the concept space may be used to locate texts in some defined class.

The techniques described herein are now described with reference to the drawings. FIG. 1 shows an example process in which texts may be mapped to concept space, and in which the concept space may be used to locate texts in some defined class. The generalized process is first described with reference to FIG. 1; example details of the process are then described with reference to FIGS. 2-4.

At 102, texts are mapped to a concept space. When the mapping is performed, each text is assigned some point in a linear concept space. The mapping is performed using a kernel, which is a function that maps non-linear information to a linear space. An example kernel is described in greater detail below in connection with FIGS. 2-3. The mapping then may be used to determine whether particular texts fall inside or outside of some substantive class. E.g., "texts about reptiles" is a substantive class, and the mapping can be used to determine whether a given text falls inside of this class (i.e., the text is about reptiles), or outside of the class (i.e., the text is not about reptiles).

In order to use the mapping to make class membership decisions, it is determined what region of the concept space is associated with class membership, and what region of the concept space is associated with class non-membership. One way to do this is to use machine learning techniques. In order to use such techniques, a set of labeled examples of membership and non-membership is obtained at 104. For example, if the goal is to determine what region of the concept space contains texts that are about reptiles and what region contains texts that are not about reptiles, then two sets of documents can be obtained—one set about reptiles, the other set not about reptiles—and the documents can be labeled accordingly. The actual labeling of the documents can be performed in any appropriate manner: e.g., by human examination of the documents, or using an algorithmic technique performed by machine. Once the labeled examples have been obtained, machine learning techniques may be used, at 106, to train a classifier on the examples. The classifier, in effect, identifies the hyperplane that bifurcates the concept space into two regions, such that the region of space on one side of the hyperplane represents membership in the class and the region of space on the other side of the hyperplane represents non-membership in the class. If the concept space is n-dimensional, then the hyperplane is a (n−1)-dimensional object in the n-dimensional space. It is noted that the ability to identify a hyperplane that represents, in the concept space, the boundary between class membership and class non-membership is a feature of the linearity of the concept space.

The process of identifying a hyperplane boundary between membership and non-membership, as performed at 104 and 106, may be performed for any number of classes. In the example above, a hyperplane is identified that marks the boundary between the region the concept space that is about reptiles and the region of the concept space that is not about reptiles. Any number of additional classes (e.g., documents about computer science, documents about breakfast foods, documents about travel, documents about lima beans, etc.) could be defined. For any such class, a hyperplane could be identified that defines the boundary between membership and non-membership in the class.

At 108, the substantive class(es) on which texts are sought is identified. The particular class(es) on which text is sought might be identified through a query, but could also be identified in other ways. For example, if a person enters the query "cooking lima", the search engine might determine that this is a query that calls for lima bean recipes. In that case, the search engine might understand that the results the searcher is looking for are members of the intersection of (a) the recipe class, and (b) the lima bean class. On the other hand, if the search engine determines that the query is actually about cooking classes in the city of Lima, then it might look for texts that are in the intersection of (a) the cooking lesson class, and (b) the Peru class. Assuming that hyperplanes have been identified that divide the concept space based on these classes, the region(s) that contain the sought text can be identified at 110. That is, if we are looking for lima bean recipes, then we simply look for the intersection of (a) the region that represents membership in the recipe class, and (b) the region that represents membership in the lima bean class. This intersection is, itself, a region (or, possibly, a plurality of disjoint regions). In other words, the search engine can then determine that a particular text is to be made part of the search results (or, at least, is a candidate for inclusion in the search results) based on the fact that the text falls into the relevant class(es).

Texts that are about lima bean recipes have been mapped to points in the concept space that lie in this intersection. Thus, once the intersection has been identified, the texts that lie in the intersection may be identified at 112, by simply looking for those points that lie in the intersecting region of concept space. Tangible results containing, or based on, the identified documents may then be provided at 114. While the subject matter herein is not limited to search engines, in one example the results may be search results that are to be tangibly displayed, or tangibly communicated, to a person. It is noted that the act of providing the results may involve further filtering. For example, suppose the "cooking lima" query is interpreted as being for cooking classes in Lima, Peru. Then a search engine may look for texts in the intersection of the "cooking lessons" and "Peru" regions of the concept space. The texts in this intersection may include texts about cooking lessons in Lima, but may also include texts about cooking lessons in other Peruvian cities, such as Arequipa. Thus, the results could be filtered geographically (rather than by location in concept space) to include only results that appear to be local to the city of Lima. In this way, the actual results that are provided to a person may be based both on identifying appropriate regions in a concept space, and also based on other techniques.

Additionally, it is noted that the class may be defined based on a feature of the physical world. In this sense, a text may be considered a form of data, and a text may be considered a member of the class if the data (i.e., the text) is about a physical property of the world, or if the text is about a thing having a physical existence. For example, a car is a thing having a physical existence, and a class might be "all texts that are about cars." In this sense, the class membership/non-membership distinction divides the concept space into those texts that relate to a particular physical thing (cars), and those that do not. Similarly, a class might be defined as "texts about the second law of thermodynamics," "texts about rotoviruses," "texts about halogens," etc. In this way, the decision about whether text is, or is not, in a class is a decision about whether the data (i.e., the text) does, or does not, describe a particular physical property of the world. Moreover, membership in a class implies that the text is descriptive of the physical property or physical thing in question.

Example of the various actions in FIG. 1 are now described in greater detail.

First, we turn to the act of mapping texts to concept space, at 102. An example concept space is the set of all Wikipedia articles. Each Wikipedia article corresponds to a concept. A point in this example concept space is a measure of the relevance that a given text has to each of the Wikipedia articles. Assuming that there is a numerical measure of how relevant one text is to another, this measure can be used to compare a given text to each Wikipedia article, thereby resulting in a number, or score, for each article. If there are three million Wikipedia articles, then each text that is to be mapped to concept space can be assigned three million scores, where each score represents how similar the text is to one of the Wikipedia articles. A vector that contains the three million relevance scores that the text received against the Wikipedia articles represents the text's point in concept space. It is noted that Wikipedia articles are a convenient example of a concept space, since Wikipedia articles span a wide range of topics, even though the number of Wikipedia articles (about three million) is still a manageable number of documents to work with. In theory, any sufficiently large and diverse collection of textual material—e.g., a collection of magazine articles, the index of the Dewey Decimal System, etc.—could be used as a concept space, as long as there is some meaningful way to score the relevance of the text against each concept in the space.

Figure 2:
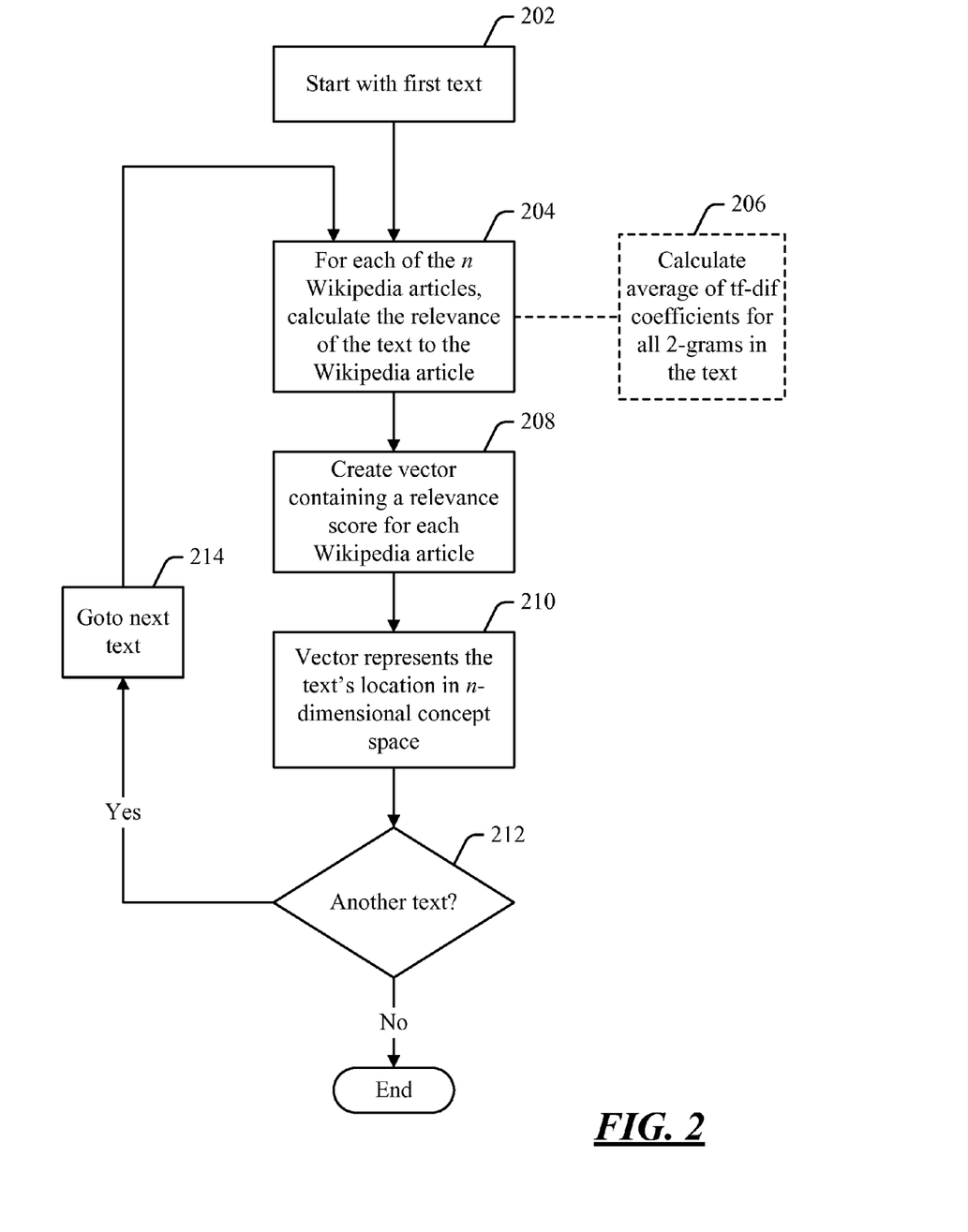
FIG. 2 is a flow diagram of an example process for mapping texts to concept space.

FIG. 2 shows, in the form of a flow chart, and example process of mapping points into a concept space based on Wikipedia articles (which is an example way of performing the action at 102 in FIG. 1). The process shown in FIG. 2 implements an example of a kernel function, in the sense that it maps text to points in a linear concept space. In FIG. 2, it is presumed that there is some set of one or more text to be classified. At 202, the process starts with a first one of those texts. Then the process calculates the relevance of the text to each of the Wikipedia articles—i.e., if there are n Wikipedia articles, the process calculates n separate relevance scores, one for each article.

There are various ways to calculate each of the relevance scores. However, one example way is to calculate the term frequency-inverted document frequency (TF-IDF) weight for each 2-gram, and then combining (e.g., averaging) the weights of all of the 2-grams (block 206). For example, the text "I will be on vacation for two weeks" can be viewed as a set of 2-grams: "I will", "will be", "be on", . . . , "for two", and "two weeks." The Wikipedia article on oysters contains the phrase " . . . oysters can have a fairly long shelf-life: up to two weeks . . . ." Since the example text and the Wikipedia article on oysters both contain the 2-gram "two weeks", the text would receive a positive score for the 2-gram "two weeks." However, since the example text and the Wikipedia article on oysters do not have any other 2-grams in common, the text would receive a zero score for all of the other 2-grams. These scores would then be averaged to arrive at a single number that represents the relevance of the phrase "I will be on vacation for two weeks" to the Wikipedia article on oysters. This process is then repeated for each of the n Wikipedia articles, so that the result of performing the action at 204 is to generate n separate scores for a given text.

It is noted that the use of 2-grams as the unit of comparison is arbitrary. A text could be compared to a Wikipedia article word by word, 3-gram by 3-gram, 4-gram by 4-gram, etc.

Once the text has a score for each Wikipedia article, a vector containing all of the scores is created at 208. One aspect of Wikipedia articles is that estimates of the overall significance of the article tends to be positively correlated with the number of out links (i.e., the number of links that the article contains to other articles), as opposed to the web in general where human estimates of the significance of a web page tends to be positively correlated with the number of in links. Thus, each component of the vector can be weighted based on the number of out links in the Wikipedia article to which that component pertains. Symbolically, we can write that there are n Wikipedia articles, $C_1, \ldots, C_n$, the relevance of a given text, t, to the $i^{th}$ article is $C_i(t)$, the weight of the $i^{th}$ article (e.g., based on the article's number of out links) is $a_i$, and the vector that contains all of the (possibly weighted) relevance scores for the text is $\langle a_1 C_1(t), \ldots, a_n C_n(t) \rangle$. (If the weighting of Wikipedia articles is omitted, then $a_1 = \ldots = a_n = 1$.) Using this symbolic notation, the mapping process can be written as:

$$t \rightarrow \langle a_1 C_1(t), \ldots, a_n C_n(t) \rangle,$$

where the vector produced by the mapping process is t's corresponding point in concept space (block 210).

If there is another text to map to concept space (as determined at 212), then the process goes to the next text (at 214) and returns to 204 to being the process of comparing that document with the set of Wikipedia article and generating a vector for that article. If there are no more texts to consider (as determined at 212), then the process of FIG. 2 terminates.

Figure 3:
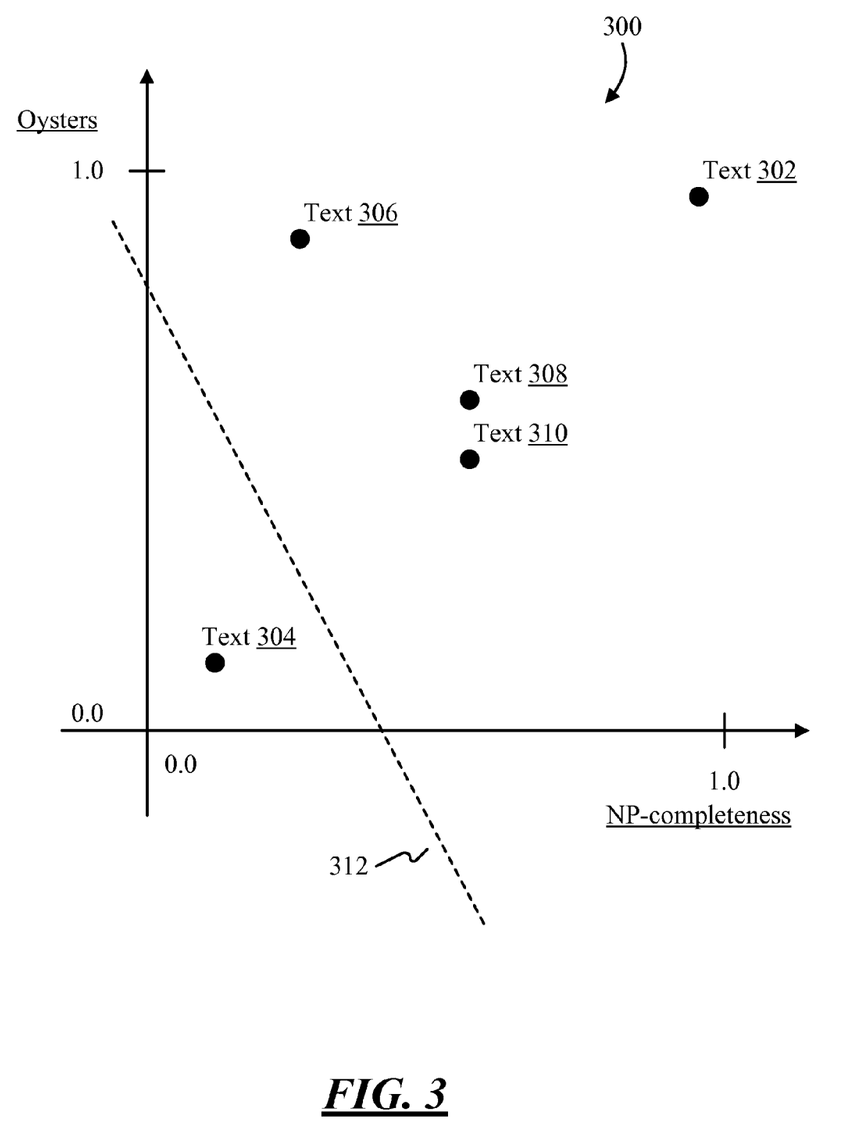
FIG. 3 is a block diagram of an example concept space.

The process of FIG. 2 maps a text to an n-dimensional concept space, where n is the number of Wikipedia articles. Thus, if there are three million articles, the mapping process assigns, to each text, a point in a three-million-dimensional space. It is hard to visualize a three-million-dimensional space, so FIG. 3 shows, for illustration purposes, an example of a concept space in two dimensions.

Concept space 300 is a 2-dimensional concept space. It is based on two concepts: oysters and NP-completeness. Each concept corresponds to a dimension in the space, so each concept has its own axis. These concepts have nothing to do with each other, but that fact is helpful for reasons that will be made clear below.

Several texts 302, 304, 306, 308, and 310, are mapped to concept space 300. Each point in concept space can be represented by a vector that contains a position along the NP-completeness axis and a position along the oyster axis. The position along each axis indicates how similar a given text is to the concept that corresponds to the axis. Thus, if the two concepts correspond to the Wikipedia articles on NP-completeness and oysters, then (using the example process of FIG. 2), a text could be assigned a position along the NP-completeness axis based on how similar that text is to the Wikipedia article on NP-completeness, and could be assigned a position along the oyster axis based on how relevant that text is to the Wikipedia article on oysters. (In this example, a score of 0.0 indicates no relevance whatsoever, and a score of 1.0 indicates complete relevance; however, any type of scoring system could be used.) So, by visual inspection of the graph it can be seen that text 302 has a position of roughly $\langle 0.95, 0.95 \rangle$ (indicating that text 302 is very relevant to both concepts); text 304 has a position of roughly $\langle 0.1, 0.1 \rangle$ (indicating that text 304 is not very relevant to either concept); text 306 is roughly at $\langle 0.3, 0.9 \rangle$ (moderately relevant to NP-completeness, but highly relevant to oysters); texts 308 and 310 are at roughly ⟨0.5,0.4⟩ and ⟨0.5,0.5⟩ (moderately relevant to both concepts).

Based on the positions of the texts in concept space, the similarity and dissimilarity of texts can be compared. For example, it can be seen that text 302 is very dissimilar from text 304, in the sense that one of these texts is very relevant to NP-completeness and oysters, and the other one is very irrelevant to these concepts. Moreover, it can be seen that texts 308 and 310 are very similar to each other. It cannot be determined from the diagram of concept space 300 what texts 308 and 310 are actually about, or what would cause both of these documents to score as being moderately relevant to two seemingly unrelated concepts. What can be determined is that these documents have some type of similarity to each other, in the sense that both documents have exactly the same level of relevance to NP-completeness, and almost the same level of relevance to oysters.

Thus, it can be seen that the actual concepts that are used to define concept space are like the grid lines on a Cartesian plane—they serve as an arbitrary measure against which to assign position in space, as well as to judge the similarly/dissimilarity of two points in space. It can also be seen why the dissimilarity of the concepts actually helps the space to differentiate texts. For example, if the two concepts that defined concept space 300 were "oysters" and "mollusks", it would mean very little to say that a text was highly relevant (or highly irrelevant) to both concepts. These two concepts are very similar to each other, and it would be hard to find a text that is relevant to one concept and irrelevant to the other concept. So, when the concepts are similar to each other, the text's position in 2-dimensional space provides very little information that cannot be gleaned from one dimension. On the other hand, when the concepts are dissimilar from each other, a text's position in concept space provides relatively rich information about the text.

One consequence of mapping texts to a linear concept space is that it is possible to draw boundaries that distinguish class membership from class non-membership. For example, suppose that we want to determine what portion of concept space 300 relates to reptiles and what portion does not. Line 312 may be a dividing boundary, such that texts that are mapped to the lower left of line 312 are about reptiles and texts that are to the upper right of line 312 are not about reptiles. (In the foregoing discussion, we have described a class-membership boundary line in n-dimensional space as being an (n–1)-dimensional hyperplane. The geometry of FIG. 3 is correct in this respect: concept space 300 is 2-dimensional, and the boundary is a line, which is a 1-dimensional figure. In this sense, "line" can simply be viewed as a term for a 1-dimensional hyperplane.) In the context of NP-completeness/oyster space, the position of line 312 makes sense, since one thing that texts about reptiles are likely to have in common is that they have very little to do with NP-completeness, but might have something to do with oysters (since some reptiles feed on oysters). Line 312 might not distinguish between reptile texts and non-reptile texts with perfect accuracy; some reptile texts might lie on the right side of line 312, and some non-reptile texts might lie on the left side of line 312. However, even if line 312 does not distinguish reptile text from non-reptile texts with perfect accuracy, it is still possibly to draw this line meaningfully, such that the subset of the mapped texts that relate to reptiles tend to lie on one side of the line.

Moreover, the reptile/non-reptile example illuminates an interesting fact: it is possible to use a concept space to identify texts on a particular subject, even if the concept space contains no dimension corresponding to that subject. It will be recalled that, in mapping texts 302-310 to concept space 300, no direct comparison was made between texts 302-310 and the concept "reptile". Nonetheless, it is possible (again, with some level of certainty) to describe the set of texts that relate to reptiles based on how those texts compared to two other concepts. In this sense, when we are attempting to define the region of concept space that relates to a particular topic (i.e., is a member of class X), it makes no difference whether that topic is one of the concepts that defines the space. The concepts themselves are merely the measure against which we can judge the similarity or differences among a set of texts. The actual definition of what region of concept space corresponds to a particular topic is defined by other mechanisms—i.e., the drawing of appropriate boundaries. In fact, even if a concept space does contain a dimension corresponding to a particular topic, the region of the space that relates to that topic might be defined in a way that is more complex than merely looking at texts whose vector contains a high score for that topic. For example, if one of the dimensions in a concept space is a lima bean concept, then lima bean recipes and cooking lessons in Lima, Peru are both likely to score highly on that topic. Thus, when defining what region of a concept space relates to lima beans, the boundary might be based not merely on which regions of the space contain high relevance scores against the lima bean Wikipedia article, but also which regions contain high relevance scores against other concepts such as "tablespoon", "butter", or other concepts that might have to do with lima bean recipes.

Of course, the above example demonstrates one issue with concept space 300, which is that it is difficult to draw meaningful distinctions between documents using a 2-dimensional space. In a real-world implementation, a concept space might contain thousands or millions of dimensions. Thus, the set of Wikipedia articles (of which there are approximately three million, at the present time) is one example way to create an effective concept space. However, it will be readily understood how to generalize 2-dimensional concept space 300 of to an n-dimensional concept space.

Figure 4:
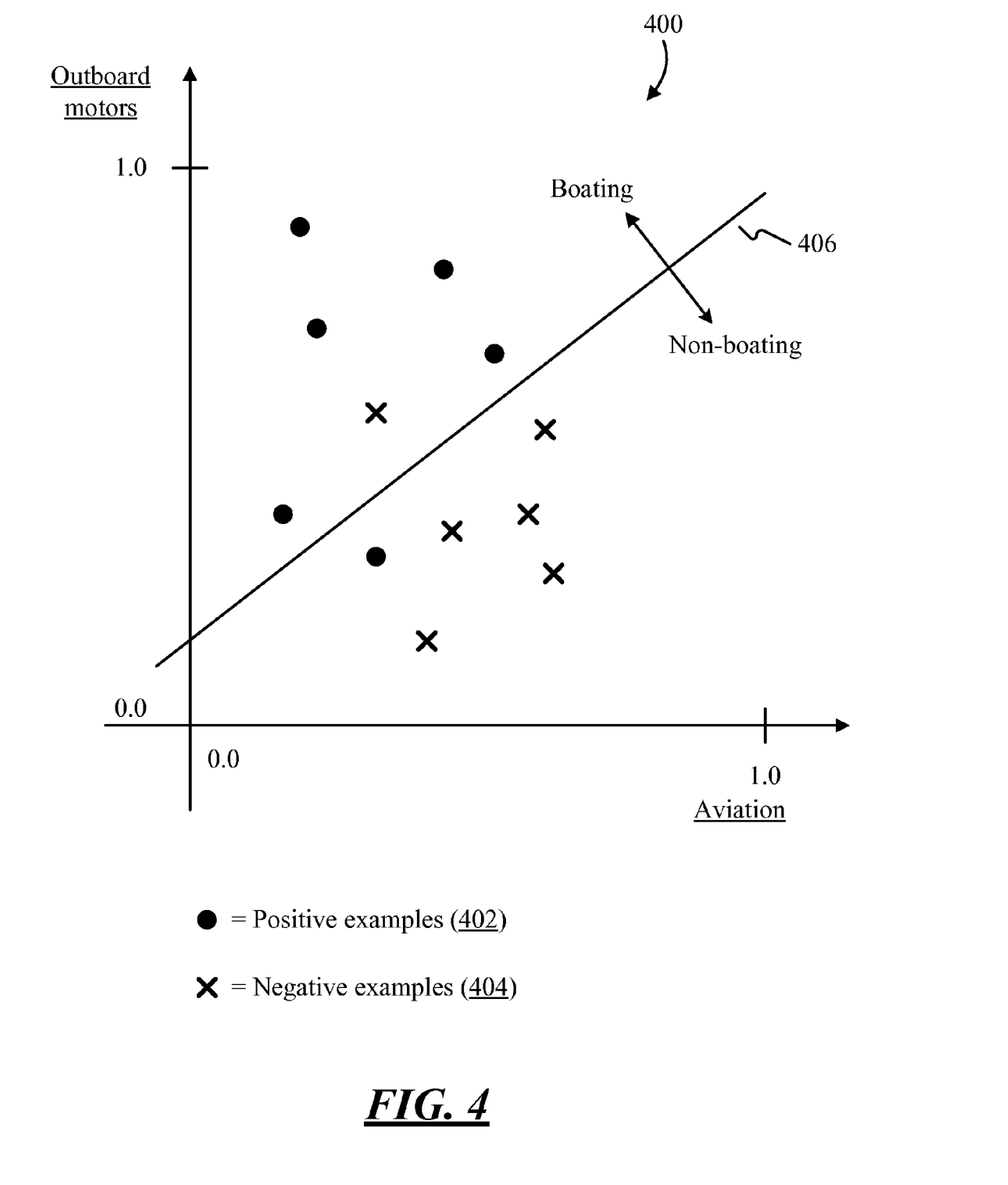
FIG. 4 is a block diagram of an example boundary between class membership and class non-membership.

The discussion of line 312 above is non-specific as to how that line is created. If we seek to define the boundary between membership and non-membership in some class, the boundary can be defined in any manner. However, one way to define such a boundary is shown at 104 and 106 of FIG. 1. FIG. 4 shows an example of how such a boundary can be defined.

In FIG. 4, a concept space 400 is defined by two concepts: aviation and outboard motors. The class in this example is "boating"—i.e., we wish to find the region of concept space in which texts on boating are likely to be found, and we wish to find that boundary that defines that region. Thus, a set of labeled examples are found. The labeled examples are positive examples 402 and negative examples 404. Positive examples 402 are points in concept space 400 that correspond to texts that have been determined to be about boating. Negative examples 404 are points in concept space 400 that are distinct from positive examples 402 and that correspond to texts that have been determined not to be about boating. The texts' points in concept space 400 are determined by a mapping process. E.g., we might have a Wikipedia article on outboard motors, and another Wikipedia article on aviation. Thus, each text could be scored for relevance against these two articles, resulting in two scores for each text. The vector containing each text's two scores is then the text's position in concept space 400.

The positive and negative examples are then obtained by evaluating some of the texts that have been mapped to concept space, and labeling these texts as being either (a) about boating (positive examples), or (b) not about boating (negative examples). In the example of FIG. 4, positive examples 402 are shown by a solid dot, and negative examples 404 are shown by an "X". As can be seen, positive examples 402 tend to cluster in the upper left corner of the graph of concept space 400, and negative examples tend to cluster in the lower right corner. This distribution makes sense, since texts that are highly relevant to the "outboard motors" concept are likely be about boating, and texts that are highly relevant to the "aviation" concept are less likely to be about boating.

The labeled examples can be used as input to a machine learning algorithm. It is noted that many machine learning techniques are based on linear algebra, and thus the ability to use machine learning on concept space 400 is based on the linearity of the space. The machine learning algorithm may identify boundary 406, which separates concept space 400 into boating and non-boating regions. The boating region of concept space 400 lies to the upper left of boundary 406, and the non-boating region lies to the lower right. It can be seen that almost all of the positive examples lie in the boating region, and almost all of the negative examples lie in the non-boating region. However, there may be certain anomalies among the examples, and the machine learning process may not be able to find a boundary that puts all positive and negative examples on the appropriate site of the boundary. The boundary is simply a reasonable guess as to how to divide the space, based on statistical methods employed by the machine learning algorithm.

It is noted that boundary 406 is shown as a line. As explained above in connection with FIG. 3, a boundary that divides an n-dimensional concept space by class membership is generally an (n−1)-dimensional hyperplane, so in the 2-dimensional concept space that is used here for illustration purposes, the (n−1)-dimensional hyperplane is a line.

Figure 5:
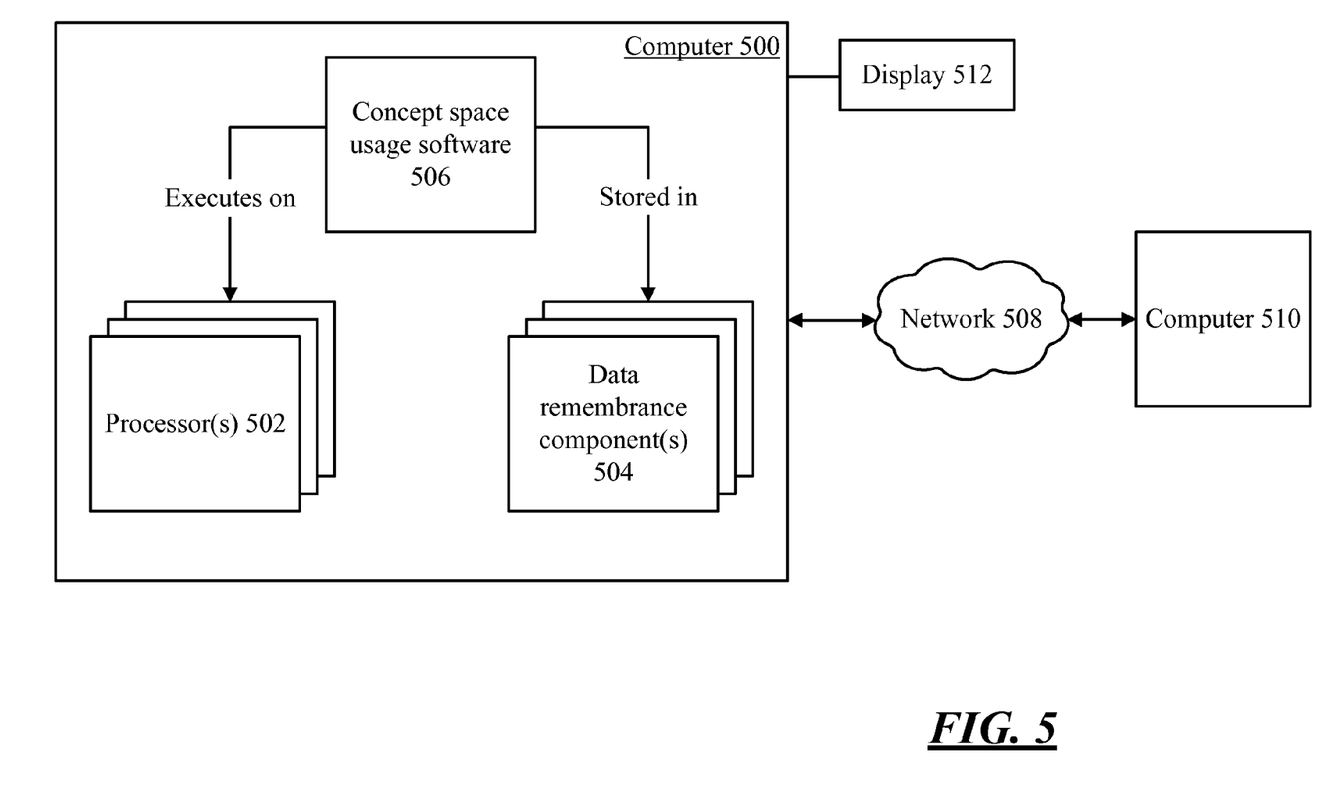
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is concept space usage software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions for determining a text's membership in a class, wherein the instructions, when executed by a computer, cause the computer to perform acts comprising:
   mapping a plurality of first texts to a concept space, said text being one of said plurality of first texts;
   training a classifier on a set of labeled examples to identify a boundary, in said concept space, between class membership and class non-membership, wherein said set of labeled examples comprises a first set of points that correspond to texts that are members of said class and a second set of points that are distinct from said first set of points and that correspond to texts that are non-members of said class;
   using said boundary to identify a region in said concept space that contains non-members of said class, said concept space having n dimensions, said boundary being a hyperplane that has exactly n−1 dimensions and that bifurcates said concept space;
   identifying one or more second texts that are in said region, said second texts being a subset of said plurality of first texts; and
   providing, to a user, a tangible result that identifies said one or more second texts.

2. The one or more computer-readable storage media of claim 1, wherein said concept space comprises n Wikipedia articles.

3. The one or more computer-readable storage media of claim 2, wherein said mapping assigns each of said plurality of first texts a position in concept space by assigning, for each of said plurality of first texts, a relevance score against each of the n Wikipedia articles and by creating a vector that contains each of the n relevance scores for a given one of the plurality of first texts.

4. The one or more computer-readable storage media of claim 3, wherein each of the relevance scores is based on TF-IDF weights.

5. The one or more computer-readable storage media of claim 3, wherein a relevance score for said given one of the plurality of first texts against a given one of the n Wikipedia articles is calculated by determining the relevance of each 2-gram in said given one of the plurality of first texts to one of the n Wikipedia articles and combining the relevances of each of the 2-grams.

6. The one or more computer-readable storage media of claim 1, wherein said acts further comprise:
receiving a query; and
determining that said query calls for results in said class, wherein said one or more second texts are responsive to said query.

7. The one or more computer-readable storage media of claim 1, said concept space being a linear space.

8. A method of providing a result based on a first text's membership in a class, the method comprising:
using a processor to perform acts comprising:
mapping a plurality of texts to a concept space, said plurality of texts including said first text;
identifying a class;
identifying a boundary that divides said concept space into a first region corresponding to membership in said class and a second region corresponding to non-membership in said class, said concept space having n dimensions, said boundary being a hyperplane that has exactly n−1 dimensions and that bifurcates said concept space;
determining that said first text is a member of said class based on said first text's being mapped to a point in said concept space that is in said first region; and
communicating, to a user, information that is based on said first text's being a member of said class.

9. The method of claim 8, wherein said concept space comprises a set of n Wikipedia articles, said concept space being n-dimensional with each dimension corresponding to one of the n Wikipedia articles.

10. The method of claim 9, wherein said mapping assigns each of said plurality of texts a position in concept space by assigning, for each of said plurality of texts, a relevance score against each of the n Wikipedia articles and creating a vector that contains each of the n relevance scores for a given one of the plurality of texts.

11. The method of claim 10, wherein each of the relevance scores is based on TF-IDF weights.

12. The method of claim 10, wherein a relevance score for said given one of the plurality of texts against a given one of the n Wikipedia articles is calculated by determining the relevance of each 2-gram in said given one of the plurality of texts to one of the n Wikipedia articles and combining the relevances of each of the 2-grams.

13. The method of claim 9, wherein said acts further comprise:
weighting each of the n relevance scores in positive correlation with a number of out links from a Wikipedia article to which a given score corresponds.

14. The method of claim 8, wherein said acts further comprise:
receiving a query; and
determining that said query calls for results in said class, wherein said information comprises said first text.

15. The method of claim 8, wherein said class is defined as being texts on a particular physical property, or on a thing having a physical existence, such that, for a text to be a member in said class, implies that said text is descriptive of said physical property or of said thing, and for a thing to be a non-member of said class implies that said text is not descriptive of said physical property or of said thing.

16. The method of claim 8, said concept space being a linear space.

17. A system for responding to a search query, the system comprising:
a memory;
a processor; and
a component that is stored in said memory and that executes on said processor, wherein said component maps a plurality of texts to a concept space, receives said search query, identifies a class that comprises results that responds to said search query, identifies a boundary that divides said concept space into a first region that corresponds to membership in said class and a second region that corresponds to non-membership in said class, identifies a text that is in said first region, and provides, to a user, a set of search results that comprises said text, said concept space having n dimensions, said boundary being a hyperplane that has exactly n−1 dimensions and that bifurcates said concept space.

18. The system of claim 17, wherein said concept space comprises a set of n Wikipedia articles, said concept space being n-dimensional with each dimension corresponding to one of the n Wikipedia articles.

19. The system of claim 18, wherein said component maps said plurality of texts to said concept space by assigning, for each of said plurality of texts, a relevance score against each of the n Wikipedia articles and creating a vector that contains each of the n relevance scores for a given one of the plurality of texts.

20. The system of claim 17, said concept space being a linear space.

* * * * *